(12) United States Patent
Han et al.

(10) Patent No.: US 9,460,653 B2
(45) Date of Patent: Oct. 4, 2016

(54) FLAT PANEL DISPLAY

(75) Inventors: Min Koo Han, Seoul (KR); Huyn Sang Park, Seongnam-si (KR)

(73) Assignee: Seoul National University R&DB Foundation (KR)

( * ) Notice: Subject to any disclaimer, the term of this patent is extended or adjusted under 35 U.S.C. 154(b) by 1692 days.

(21) Appl. No.: 12/123,895

(22) Filed: May 20, 2008

(65) Prior Publication Data

US 2008/0291351 A1    Nov. 27, 2008

(30) Foreign Application Priority Data

May 25, 2007    (KR) .................. 10-2007-0050848

(51) Int. Cl.
| | | |
|---|---|---|
| *G02F 1/133* | (2006.01) | |
| *G09G 3/32* | (2016.01) | |
| *G02F 1/1362* | (2006.01) | |
| *G09G 3/36* | (2006.01) | |

(52) U.S. Cl.
CPC .......... *G09G 3/3225* (2013.01); *G02F 1/13624* (2013.01); *G09G 3/3648* (2013.01); *G09G 2300/0814* (2013.01); *G09G 2320/0233* (2013.01)

(58) Field of Classification Search
CPC ..................................................... G09G 3/36
USPC .................................... 345/76, 77, 82, 83, 92
See application file for complete search history.

(56) References Cited

U.S. PATENT DOCUMENTS

| | | | |
|---|---|---|---|
| 8,071,982 B2* | 12/2011 | Koyama .................... | 257/59 |
| 2004/0174349 A1* | 9/2004 | Libsch et al. ............. | 345/204 |
| 2006/0038762 A1* | 2/2006 | Chou ......................... | 345/92 |
| 2007/0296671 A1* | 12/2007 | Han et al. .................. | 345/92 |

FOREIGN PATENT DOCUMENTS

| | | |
|---|---|---|
| JP | 2000-010072 A | 1/2000 |
| KR | 10-2003-0003446 A | 1/2003 |
| KR | 10-2004-0087427 A | 10/2004 |
| KR | 10-2005-0097286 A | 10/2005 |

* cited by examiner

*Primary Examiner* — Claire X Pappas
*Assistant Examiner* — Sepideh Ghafari
(74) *Attorney, Agent, or Firm* — Park & Associates IP Law, P.C.

(57) ABSTRACT

Disclosed is a flat panel display that prevents image quality degradation by preventing the current leakage to the organic light emitting diode. The flat panel display comprises: a first switching element whose control electrode is electrically coupled to a scan line, being electrically coupled between a data line and a first voltage line; a second switching element whose control electrode is electrically coupled to the scan line, being electrically coupled between the first switching element and first voltage line; a capacitive element whose first electrode is electrically coupled between the first and second switching elements; a drive transistor whose control electrode is electrically coupled to the second switching element, being electrically coupled between the first voltage line and a second voltage line; and an organic light emitting diode electrically coupled between the drive transistor and second voltage line.

3 Claims, 11 Drawing Sheets

FLAT PANEL DISPLAY

FIELD OF THE INVENTION

The present invention relates to a flat panel display, and more particularly, to a flat panel display that can minimize degradation of image quality caused by leakage current of a pixel circuit.

BACKGROUND OF THE INVENTION

A flat panel display includes a passive matrix (PM) type and an active matrix (AM) type using a MOS (Metal Oxide Silicon) thin film transistor (TFT). In the active matrix (AM) type flat panel display, a thin film transistor and a capacitive element are connected to respective ITO (indium tin oxide) pixel electrodes for keeping voltages by capacitance of capacitors. The active matrix type flat panel display is widely used according to tendency of high resolution.

The thin film transistor used in the active matrix type flat panel display is generally classified into a poly-silicon thin film transistor and an amorphous silicon thin film transistor according to a kind of an active layer. The poly-silicon thin film transistor has high electron mobility, excellent optical stability and reliability compared than the amorphous silicon thin film transistor. Thus, the poly-silicon thin film transistor is usually used in the active matrix type flat panel display.

Methods of crystallizing the amorphous silicon into the poly-silicon include a solid phase crystallization method, an excimer laser crystallization method capable of low temperature crystallization, a metal induced crystallization and a metal induced lateral crystallization. The solid phase crystallization method has problems that its process time is too long and a substrate is easily deformed by heat treatment at a high temperature for a long time. The excimer laser crystallization method capable of low temperature crystallization has disadvantages in that it requires an expensive laser device and an interfacial property between a semiconductor layer and a gate insulation film is bad due to extrusions formed on the poly-crystallized surface. When the metal induced crystallization or metal induced lateral crystallization is used, metal catalysts remain in a crystallized silicon layer, thereby increasing leakage current of the semiconductor layer of the thin film transistor. Various crystallization methods have been proposed in addition to the crystallization method. However, most of newly proposed methods have a problem that the leakage current of the thin film transistor is very high. Thus, it is very difficult to use the methods actually in products.

The pixel circuit of the active matrix type flat panel display should keep a data voltage during one frame before a new data voltage is applied after the pixel circuit is applied with the data voltage. In this time, the leakage current of the thin film transistor can be changed according to a change amount of the data voltage due to the thin film transistor generating the leakage current when the new data voltage is applied to a drain of a switching element. In addition, even if the same data voltage is applied to the drain of the thin film transistor, image quality degradation phenomenon such as change of brightness and degradation of image quality is caused by difference between leakage currents of each pixel.

SUMMARY OF THE INVENTION

Accordingly, an object of the present invention is to provide a flat panel display that can prevent image quality of a display panel from being degraded by a leakage current of each pixel circuit.

Additional advantages, objects and features of the invention will be set forth in part in the description which follows and in part will become apparent to those having ordinary skill in the art upon examination of the following or may be learned from practice of the invention.

According to one embodiment of the invention, a flat panel display is provided. The flat panel display includes a first switching element, a second switching element, a capacitive element, a drive transistor an organic light emitting diode. The first switching element having a control electrode is electrically coupled to a scan line, being electrically coupled between a data line and a first voltage line. The second switching element having a control electrode is electrically coupled to the scan line, being electrically coupled between the first switching element and the first voltage line. The capacitive element having a first electrode is electrically coupled between the first switching element and the second switching element. The drive transistor having a control electrode is electrically coupled to the second switching element, being electrically coupled between the first voltage line and a second voltage line. The organic light emitting diode electrically coupled between the drive transistor and the second voltage line.

A first electrode of the first switching element may be electrically coupled to the data line, and a second electrode of the first element may be electrically coupled between a first electrode of the second switching element and the first electrode of the capacitive element.

A first electrode of the second switching element may be electrically coupled between the first switching element and the capacitive element, and a second electrode of second switching element may be electrically coupled to the control electrode of the drive transistor.

The first electrode of the capacitive element may be electrically coupled between the first switching element and the second switching element and a second electrode of the capacitive element may be electrically coupled to the first voltage line.

The first electrode of the capacitive element may be electrically coupled between the first switching element and the second switching element and a second electrode of the capacitive element may be electrically coupled to the second voltage line.

The first electrode of the capacitive element may be electrically coupled between the first switching element and the second switching element and a second electrode of the capacitive element may be electrically coupled to the third voltage line.

A first electrode of the drive transistor may be electrically coupled to the first voltage line and a second electrode of the drive transistor electrically coupled to a first electrode of the organic light emitting diode, and the control electrode of the drive transistor may be electrically coupled to the second electrode of the second switching element.

A first electrode of the organic light emitting diode may be electrically coupled to the second electrode of the drive transistor and a second electrode of the organic light emitting diode may be electrically coupled to the second voltage line.

The first switching element and the second switching element, and the drive transistor may be an N-type transistor.

The first switching element and the second switching element, and the drive transistor may be a P-type transistor.

According to another embodiment of the invention, a flat panel display is provided. The flat panel display includes a first switching element, a second switching element, a capacitive element, and a liquid crystal cell. The first switching element having a control electrode is electrically coupled to a scan line, being electrically coupled between a data line and a pixel electrode. The second switching element having a control electrode is electrically coupled to the scan line, being electrically coupled between the first switching element and the pixel electrode. The capacitive element having a first electrode is electrically coupled between the first switching element and a common electrode. The liquid crystal cell electrically coupled between the pixel electrode and the common electrode.

A first electrode of the first switching element may be electrically coupled to the data line and a second electrode the first switching element may be electrically coupled to a first electrode of the second switching element.

A first electrode of the second switching element may be electrically coupled to the first switching element and a second electrode of the second may be electrically coupled to the pixel electrode.

A first electrode of the capacitive element may be electrically coupled between the first switching element and the second switching element and a second electrode of the capacitive element may be electrically coupled to the common electrode.

A first electrode of the liquid crystal cell may be electrically coupled to the pixel electrode and a second electrode of the liquid crystal cell may be electrically coupled to the common electrode.

The first switching element and the second switching element are an N type transistor.

The first switching element and the second switching element, and the drive transistor are a P type transistor.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF THE INVENTION

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 1:
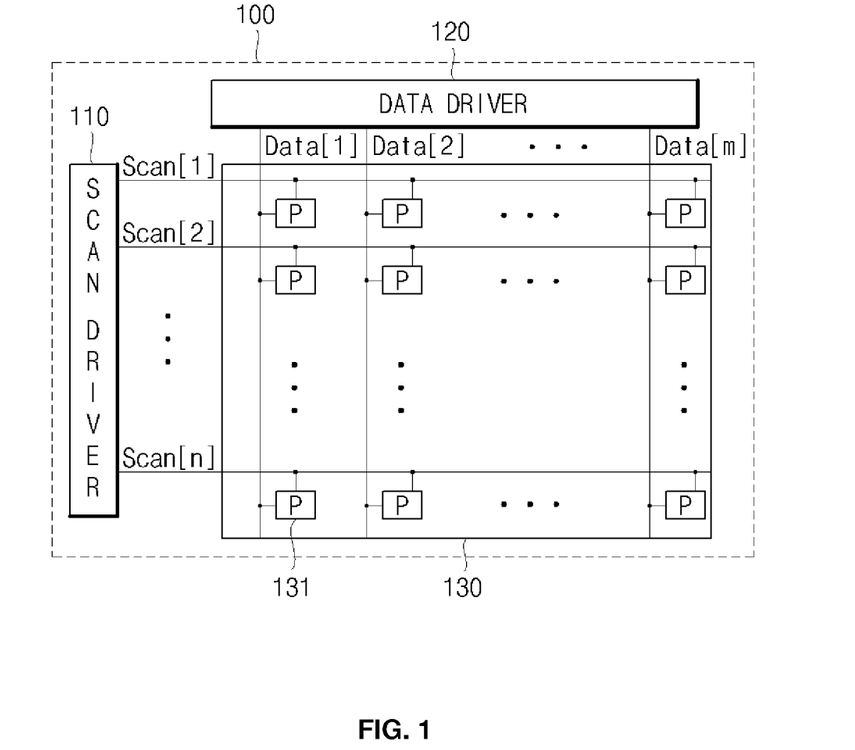
FIG. 1 is a block diagram illustrating a construction of a flat panel display according to the present invention.

FIG. 1 shows a block diagram illustrating a construction of a flat panel display according to the present invention.

Referring to FIG. 1, the flat panel display 100 may include a scan driver 110, a data driver 120 and a flat display panel 130 (hereinafter, referred to as "panel").

The scan driver 110 can sequentially supply scan signals to the panel 130 through scan lines Scan[1], Scan[2] to Scan[n].

The data driver 120 may supply data voltages to the panel 130 through data lines Data[1], Data [2] to Data [m].

The panel 130 may include a plurality of scan lines Scan[1], Scan[2] to Scan[n] arranged in a row direction, a plurality of data lines Data[1], Data [2] to Data [m] arranged in a column direction, and pixel circuits defined by the plurality of scan lines Scan[1], Scan[2] to Scan[n] and data lines Data[1], Data [2] to Data [m].

The pixel circuit may be formed in a pixel region defined by two adjacent scan lines and two adjacent data lines. Of course, as described above, the scan signal may be supplied to the scan lines Scan[1], Scan[2] to Scan[n] from the scan driver 110, and the data voltage may be supplied to the data lines Data[1], Data [2] to Data [m] from the data driver 120. The panel 130 is supplied with first, second and third voltages VDD, VSS and VREF, and supplies them to each pixel circuit 131. The pixel circuit 131 is supplied with the first, second and third voltages VDD, VSS and VREF, and displays an image on the panel in correspondence with each data voltage.

Figure 2A:
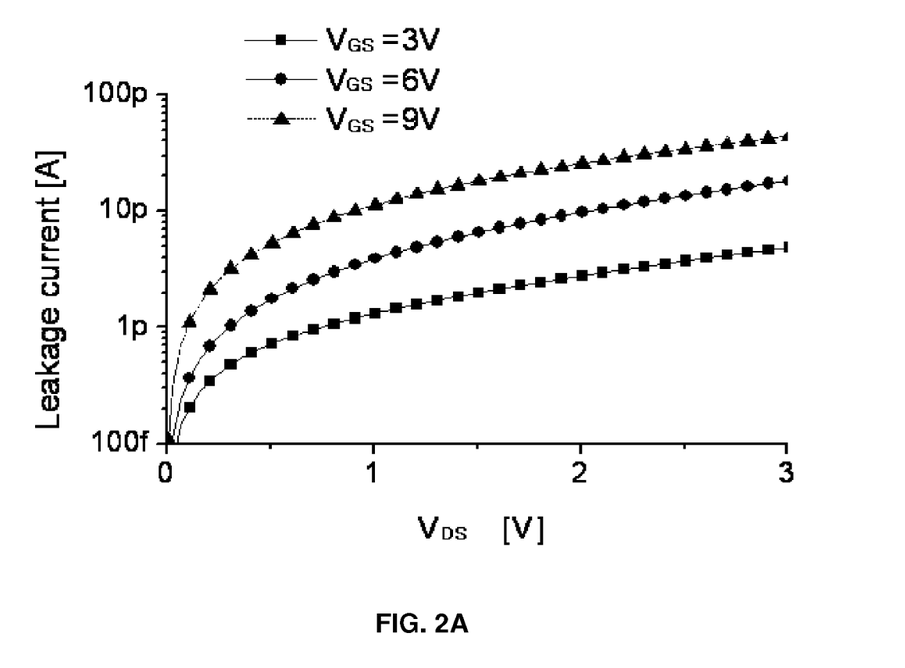
FIGS. 2a and 2b are graphs illustrating characteristics of a switching element and a drive transistor of the flat panel display.
Figure 2B:
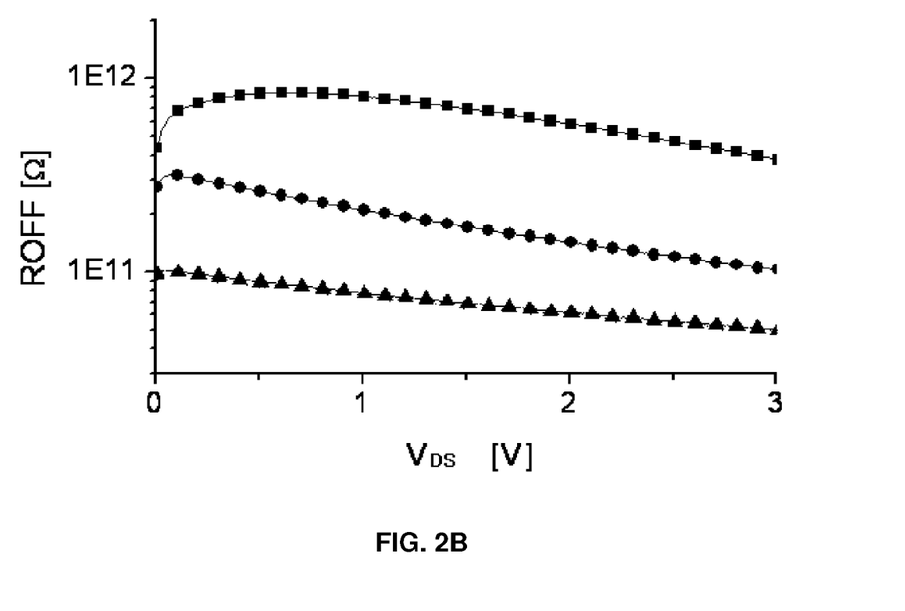

FIGS. 2a and 2b show graphs illustrating characteristics of a switching element and a drive transistor of the flat panel display. Thin film transistors are used as the switching element and drive transistor. Leakage current and OFF resistance of the thin film transistor is changed according to a voltage difference between a first electrode (drain or source electrode) and a second electrode (source or drain electrode).

FIG. 2a shows leakage currents according to a voltage difference VDS between drain and source electrodes of a usual thin film transistor and a voltage difference VGS between gate and source electrodes. Referring to FIG. 2a, the leakage current is increased according to increase of the voltage difference VDS between drain and source electrodes of the thin film transistor, and to increase of voltage difference VGS between the gate and source electrodes. This can be confirmed by an equation 1 related to the leakage current of the usual thin film transistor as following:

[Equation 1]

$$I_{leak} = I_{0L}\left[\exp\left(\frac{V_{DS}}{V_{DSL}}\right) - 1\right]\exp\left(-\frac{V_{GS}}{V_{GL}}\right) + \sigma_0 V_{DS} \quad 1$$

Here, Ileak is a leakage current, IOL is a leakage current when a gate bias is 0V, VDS is the voltage difference between the drain and source electrodes, VDSL is a correlation coefficient indicating VDS dependence of the leakage current, VGS is the voltage difference between the gate and source electrodes, VGL is a correlation coefficient indicating VGS dependence of the leakage current, σOVDS is a minimum leakage current, limited by resolution of a measuring device, that is, which the measurement device can measure. The Ileak is increased in proportion to the voltage difference VDS between the drain and source electrodes and the voltage difference VGS between the gate and source electrodes. In other words, if potential of the source electrode of the thin film transistor is fixed, potential of the drain electrode is changed. In other words, if the potential of the gate electrode is changed, the leakage current is increased.

FIG. 2b shows an OFF resistance ROFF according to a voltage difference VDS between drain and source electrodes of a usual thin film transistor and a voltage difference VGS between gate and source electrodes. The OFF resistance ROFF indicates a resistance when the thin film transistor is turned off and operated as a resistor. Referring to FIG. 2b, the OFF resistance is decreased according to increase of the voltage difference VDS between drain and source electrodes of the thin film transistor, and to increase of voltage difference VGS between the gate and source electrodes. This can be confirmed by an equation 2 related to the OFF resistance of the usual thin film transistor as following:

[Equation 2]

$$\frac{1}{R_{OFF}} = \left(\frac{\partial I_{leak}}{\partial V_{DS}}\right) = \frac{I_{0L}}{V_{DSL}}\exp\left(\frac{V_{DS}}{V_{DSL}} - \frac{V_{GS}}{V_{GL}}\right) + \sigma_0 \quad 2$$

Referring to the equation 2, the OFF resistance is in inverse proportion to the voltage difference VDS between drain and source electrodes of the thin film transistor. Here, the leakage current and OFF resistance are in inverse proportion to each other because the leakage current is proportional to the voltage difference VDS between the drain and source electrodes. In other words, when the voltage difference between drain and source electrodes of the thin film transistor is increased, the OFF resistance is decreased and accordingly the leakage current is increased. When the voltage difference between drain and source electrodes of the thin film transistor is decreased, the OFF resistance is increased and accordingly the leakage current is decreased. For example, a switching element, that is a thin film transistor in the flat panel display, includes a first electrode electrically coupled to the data line, a second electrode electrically coupled to the capacitive element, and a control electrode electrically coupled to the scan line. The first electrode of the switching element applies a data voltage to the data line, and the second electrode stores the data voltage supplied from the first electrode in the capacitive element. In this time, when the switching element is turned off and the data voltage applied to the first electrode is changed, a voltage difference is generated between the voltage applied to the first electrode and the data voltage stored in the capacitive element before turn-off. Thus, the OFF resistance is decreased and the leakage current is increased. A pixel circuit of the flat panel display including the thin film transistor will be explained in detail with reference to FIGS. 3 to 11.

Figure 3:
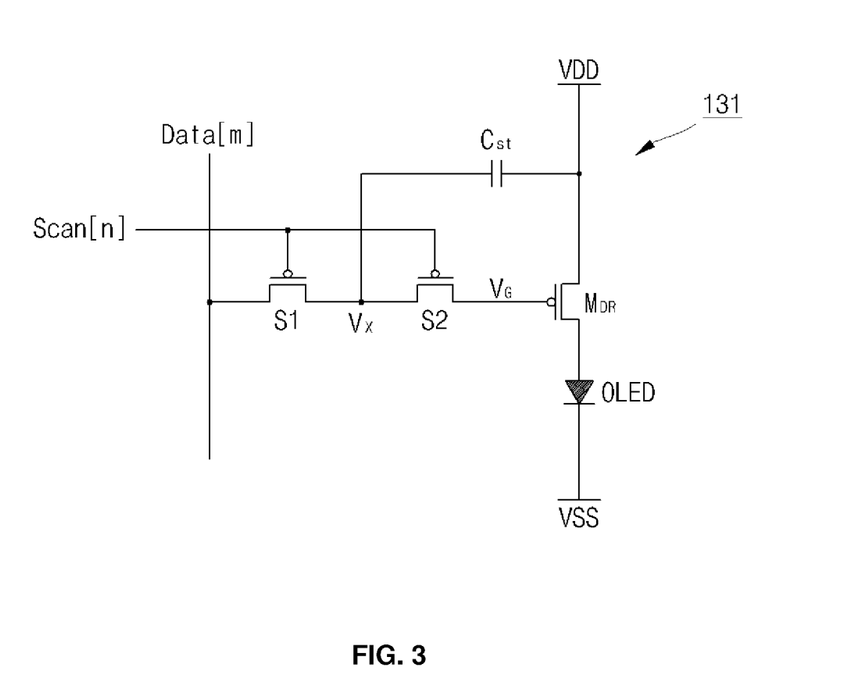
FIG. 3 is a circuit diagram illustrating a pixel circuit of the flat panel display according to one exemplary embodiment of the present invention.

FIG. 3 shows a circuit diagram illustrating a pixel circuit of the flat panel display according to one exemplary embodiment of the present invention. All pixel circuits to be explained below means one pixel circuit 131 of the flat panel display 100 shown in FIG. 1. A switching element and a drive transistor of the pixel circuit of FIG. 3 are formed of PMOS transistors. When a low level scan signal is applied to a control electrode, the switching element is turned on to apply a data voltage to the control electrode of the drive transistor. When the data voltage is applied to the control electrode, the drive transistor transmits a drive current to an organic light emitting diode. Then, the organic light emitting diode is supplied with the drive current and emits lights of a predetermined brightness.

The pixel circuit 131 of the flat panel display shown in FIG. 3 includes a scan line Scan[n], a data line Data[m], a first voltage line VDD, a second voltage line VSS, a first switching element S1, a second switching element S2, a capacitive element Cst, the drive transistor MDR and the organic light emitting diode (OLED).

The scan line Scan[n] supplies a scan signal selecting the OLED for emission to the control electrodes of the first and second switching elements S1 and S2. Of course, the scan line Scan[n] may be electrically coupled to the scan driver 110 (see FIG. 1) generating the scan signal.

The data line Data[m] supplies a data voltage proportional to a brightness of emission to a first electrode of the capacitive element Cst and a first electrode Vx of the second switching element S2. Of course, the data line Data[m] may be electrically coupled to the data driver 120 (see FIG. 1) generating the data voltage.

The first voltage line VDD supplies a first voltage to the OLED.

The second voltage line VSS supplies a second voltage to the OLED. Here, the first voltage may be higher level than the second voltage.

The first electrode (drain or source electrode) of the first switching element S1 is electrically coupled to the data line Data[m], and the second electrode (source or drain electrode) thereof is electrically coupled between the first electrode Vx of the second switching element S2 and the first electrode of the capacitive element Cst, and a control electrode (gate electrode) thereof is electrically coupled to a scan line Scan[n]. When a low level scan signal is applied to the control electrode of the first switching element S1, the first switching element S1 is turned on to supply the data voltage to the first electrode of the capacitive element Cst and the first electrode Vx of the second switching element S2. When a high level scan signal is applied to the control electrode of the first switching element S1, the first switching element S1 is turned off to interrupt the data voltage transmitted to the capacitive element Cst.

The first electrode Vx of the second switching element S2 is electrically coupled between the second electrode of the first switching element S1 and the first electrode of the capacitive element Cst, and the second electrode VG thereof is electrically coupled to the control electrode of the drive transistor MDR, and the control electrode thereof is electrically coupled to the scan line Scan[n]. When a low level scan signal is applied to the control electrode of the second switching element S2, the second switching element S2 is turned on to supply the data voltage applied from the first switching element S1 to the control electrode of the drive transistor MDR. When a high level scan signal is applied to the control electrode of the second switching element S2, the second switching element S2 is turned off to interrupt the voltage of the first electrode Vx transmitted to the second electrode VG.

In the case of a usual transistor, the lower a voltage between a drain electrode and a source electrode VDS is, the OFF resistance Roff is increased when the transistor is turned off. If the voltage level between the first and second electrodes Vx and VG of the second switching element S2 is reduced by using the characteristic as described above, the OFF resistance Roff of the second switching element S2 is increased. Thus, defects caused by the leakage current of the pixel circuit can be prevented. In other words, the OFF resistance Roff of the second switching element S2 is increased by minimizing the voltage between the first and second electrodes Vx and VG of the second switching element S2. Thus, the leakage current transmitted from the capacitive element Cst is prevented from being applied to the control electrode of the drive transistor MDR through the second switching element S2. The second switching element S2 prevents change of a drive current transmitted from the drive transistor MDR to the OLED. In other words, in the pixel circuit 131, the leakage current generated through the capacitive element Cst and first switching element S1 is similar to that of a conventional device. However, the pixel circuit 131 prevents the leakage current from being applied to the drive transistor MDR through the second switching element S2 whose OFF resistance Roff is high, thereby preventing the drive current applied to the OLED from being changed by the leakage current. The drive current of the pixel circuit 131 is not changed by the leakage current. Thus, image quality degradation of the display panel can be prevented.

A first electrode of the drive transistor MDR is electrically coupled to the first voltage line VDD, and a second electrode thereof is electrically coupled to an anode of the OLED, and a control electrode thereof may be electrically coupled to the second electrode of the second switching element S2. The drive transistor MDR is a PMOS transistor that supplies a predetermined amount of current from the first voltage line VDD to the OLED. Of course, even if the first switching element S1 is turned off, the data voltage is continuously applied to the control electrode of the drive transistor MDR for a predetermined time by a voltage stored in the capacitive element Cst and a parasitic capacitor CG (see FIG. 4) of the drive transistor.

The first electrode of the capacitive element Cst is electrically coupled between the second electrode of the first switching element S1 and the first electrode of the second switching element S2, and the second electrode thereof is electrically coupled between the first electrode of the drive transistor MDR and the first voltage line VDD. The capacitive element Cst stores a voltage difference between the first and second electrodes. The capacitive element Cst transmits the stored voltage to the control electrode of the drive transistor MDR. The drive transistor MDR transmits the drive current to the OLED, and then the OLED emits light of a predetermined brightness by the drive current.

The anode of the OLED may be electrically coupled to the second electrode of the drive transistor MDR, and a cathode thereof may be electrically coupled to the VSS. The OLED emits light of the predetermined brightness by the drive current controlled through the drive transistor MDR.

Figure 4:
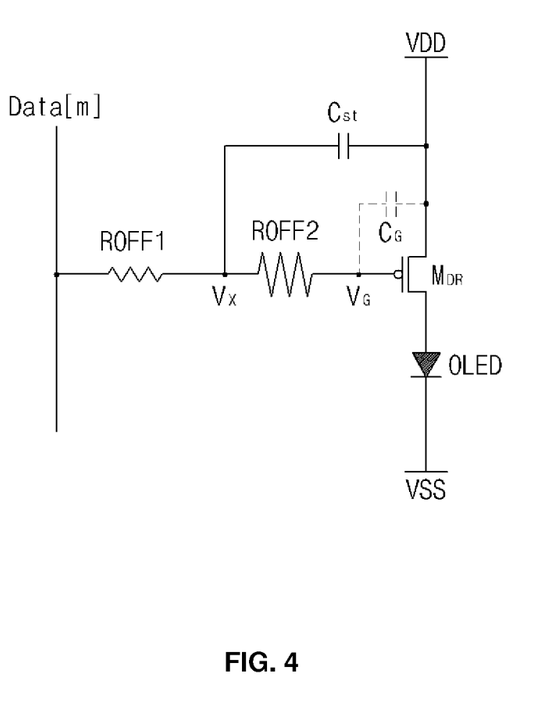
FIG. 4 is a circuit diagram illustrating an equivalent model of the pixel circuit of the flat panel display of FIG. 3.

FIG. 4 shows a circuit diagram illustrating an equivalent model of the pixel circuit of FIG. 3. The equivalent model shows the case where a high level scan signal is applied and the first and second switching elements S1 and S2 keep a turn-off state during one frame period.

Referring to FIG. 4, the equivalent model of the pixel circuit includes a first OFF resistor Roff1, a second OFF resistor Roff2, a capacitive element Cst, a drive transistor MDR, a parasitic capacitor CG and an OLED. Explaining in detail mainly for parts different from the pixel circuit shown in FIG. 3, the first and second switching elements S1 and S2 are respectively substituted by the first OFF resistor Roff1 and second OFF resistor Roff2 because the first and second switching elements S1 and S2 are turned off to operate as one resistor. The parasitic capacitor CG is shown optionally by dot lines between the control electrode and first electrode in the drive transistor MDR.

The first OFF resistor Roff1 is electrically coupled between the data line and the second OFF resistor Roff2. Accordingly, the first OFF resistor Roff1 is changed according to a voltage difference between the data line and the first electrode Vx of the second OFF resistor Roff2. In other words, when the data voltage applied to the data line is changed, a voltage difference is generated between both ends of the first OFF resistor Roff1. Thus, the first OFF resistor Roff1 is decreased.

The second OFF resistor Roff2 is electrically coupled between the second electrode of the first OFF resistor Roff1 and the control electrode of the drive transistor MDR. Accordingly, the second OFF resistor Roff2 is changed according to a voltage difference between the first and second electrodes Vx and VG of the second OFF resistor Roff2. In other words, even if the data voltage applied to the data line is changed, a voltage difference is almost not generated between both ends of the second OFF resistor Roff2. Thus, the second OFF resistor Roff2 is increased in comparison to the first OFF resistor Roff1. Because the second OFF resistor Roff2 is relatively higher than the first OFF resistor Roff1, the leakage current flowing through the second OFF resistor Roff2 is relatively decreased. In other words, the high second OFF resistor Roff2 prevents the leakage current from being applied to the drive transistor MDR. Accordingly, the leakage current through the second OFF resistor Roff2 is low. Thus, the drive current applied to the OLED is prevented from being changed into the leakage current.

The parasitic capacitor CG is shown by dot lines because it is not electrically coupled to the pixel circuit but a parasitic capacitor existing in the drive transistor MDR. The parasitic capacitor CG stores a voltage corresponding to a voltage difference between the control electrode and first electrode of the drive transistor MDR, and transmits the leakage current to the second OFF resistor Roff2. However, the parasitic capacitor CG is smaller than the capacitive element Cst and accordingly, charge stored therein is little. Thus, a large voltage change can be generated between both ends thereof. However, the parasitic capacitor can sufficiently stably keep the stored voltage during one frame because the leakage current is negligibly low in the structure described above in which the second OFF resistance is largely increased. This is based on the fact that the leakage current is generated only when a voltage difference is generated between both ends of the switching element. In other words, the voltage difference between the first and second electrodes Vx and VG of the second switching element S2 is kept at a negligibly low value by the capacitive element Cst during one frame that is sufficiently short time. Thus, the second electrode VG is a stable electrode protected and kept by the capacitive element Cst that is not a floating electrode.

Figure 5:
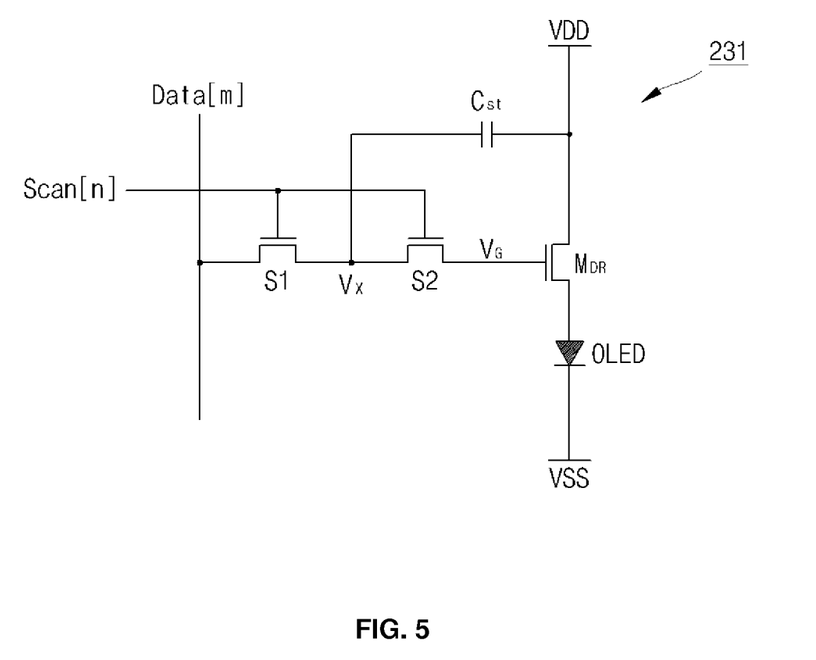
FIG. 5 is a circuit diagram illustrating a pixel circuit of a flat panel display according to another exemplary embodiment of the present invention.

FIG. 5 shows a circuit diagram illustrating a pixel circuit of a flat panel display according to another exemplary embodiment of the present invention. All pixel circuits to be explained below means one pixel circuit of the flat panel display 100 shown in FIG. 1. First and second switching elements S1 and S2 and a drive transistor MDR of the pixel circuit 231 of FIG. 5 are formed of NMOS transistors. When a high level scan signal is applied to a control electrode, the first and second switching elements S1 and S2 are turned on to apply a data voltage to the control electrode of the drive transistor. When the data voltage is applied to the control electrode, the drive transistor MDR transmits a drive current to an OLED. Then, the OLED is supplied with the drive current and emits lights of a predetermined brightness. The pixel circuit 231 of FIG. 5 operates the same as the pixel circuit 131 of FIG. 3 except that the first and second switching elements S1 and S2 operate at a high level.

Figure 6:
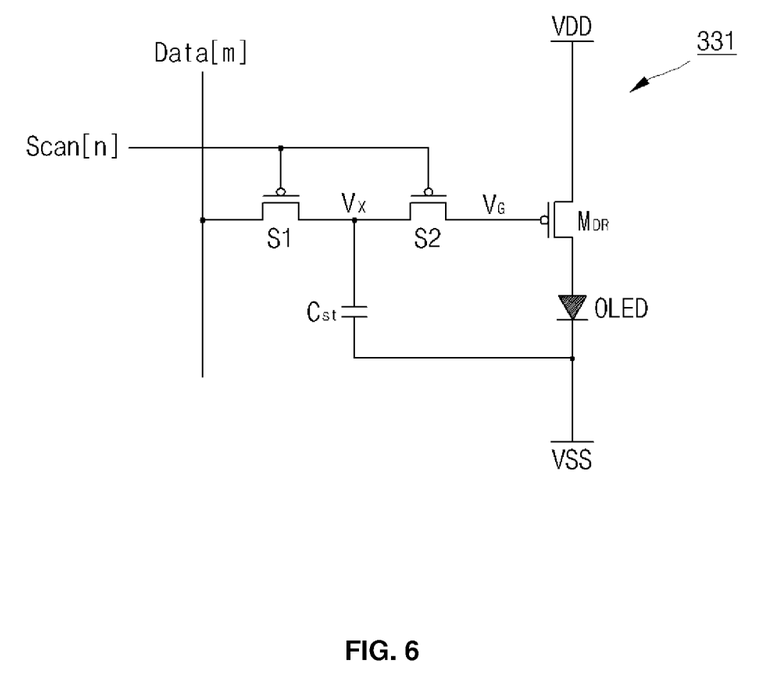
FIG. 6 is a circuit diagram illustrating a pixel circuit of a flat panel display according to a still another exemplary embodiment of the present invention.

FIG. 6 shows a circuit diagram illustrating a pixel circuit of a flat panel display according to a still another exemplary embodiment of the present invention. All pixel circuits to be explained below means one pixel circuit of the flat panel display 100 shown in FIG. 1. First and second switching elements S1 and S2 and a drive transistor MDR of the pixel circuit 331 of FIG. 6 are formed of PMOS transistors. When a low level scan signal is applied to a control electrode, the first and second switching elements S1 and S2 are turned on to apply a data voltage to the control electrode of the drive transistor MDR. When the data voltage is applied to the control electrode, the drive transistor MDR transmits a drive current to an OLED. Then, the OLED is supplied with the drive current and emits lights of a predetermined brightness.

The pixel circuit 331 of the flat panel display shown in FIG. 6 includes the first and second switching elements S1 and S2, a capacitive element Cst, the drive transistor MDR and the organic light emitting diode (OLED).

The first electrode of the first switching element S1 is electrically coupled to the data line Data[m], and the second electrode thereof is electrically coupled between the first electrode Vx of the second switching element S2 and the first electrode of the capacitive element Cst, and a control electrode thereof is electrically coupled to a scan line Scan[n]. When a low level scan signal is applied to the control electrode of the first switching element S1, the first switching element S1 is turned on to supply the data voltage to the first electrode of the capacitive element Cst and the first electrode Vx of the second switching element S2. When a high level scan signal is applied to the control electrode of the first switching element S1, the first switching element S1 is turned off to interrupt the data voltage transmitted to the capacitive element Cst.

The first electrode Vx of the second switching element S2 is electrically coupled between the second electrode of the first switching element S1 and the first electrode of the capacitive element Cst, and the second electrode VG thereof is electrically coupled to the control electrode of the drive transistor MDR, and the control electrode thereof is electrically coupled to the scan line Scan[n]. When a low level scan signal is applied to the control electrode of the second switching element S2, the second switching element S2 is turned on to apply the data voltage applied from the first switching element S1 to the control electrode of the drive transistor MDR. When a high level scan signal is applied to the control electrode of the second switching element S2, the second switching element S2 is turned off to interrupt the voltage of the first electrode Vx transmitted to the second electrode VG.

In the case of a usual transistor, the lower a voltage between a drain electrode and a source electrode VDS is, the OFF resistance Roff is increased when the transistor is turned off. If the voltage level between the first and second electrodes Vx and VG of the second switching element S2 is reduced by using the characteristic as described above, the OFF resistance Roff of the second switching element S2 is increased. Thus, defects caused by the leakage current of the pixel circuit can be prevented. In other words, the OFF resistance Roff of the second switching element S2 is increased by minimizing the voltage between the first and second electrodes Vx and VG of the second switching element S2. Thus, the leakage current transmitted from the capacitive element Cst is prevented from being applied to the control electrode of the drive transistor MDR through the second switching element S2. The second switching element S2 prevents change of a drive current transmitted from the drive transistor MDR to the OLED. In other words, in the pixel circuit 331, the leakage current generated through the capacitive element Cst and first switching element S1 is similar to that of the conventional device. However, the pixel circuit 331 prevents the leakage current from being applied to the drive transistor MDR through the second switching element S2 whose OFF resistance Roff is high, thereby preventing the drive current applied to the OLED from being changed by the leakage current. The drive current of the pixel circuit 331 is not changed by the leakage current. Thus, image quality degradation of the display panel can be prevented.

A first electrode of the drive transistor MDR is electrically coupled to the first voltage line VDD, and a second electrode thereof is electrically coupled to an anode of the OLED, and a control electrode thereof may be electrically coupled to the second electrode of the second switching element S2. The drive transistor MDR is a P type channel transistor that supplies a predetermined amount of current from the first voltage line VDD to the OLED. Of course, the data voltage is supplied to the first electrode of the capacitive element Cst, thereby allowing the capacitive element to be charged. Thus, even if the first switching element S1 is turned off, the data voltage is continuously applied to the control electrode of the drive transistor MDR for a predetermined time by the charge voltage of the capacitive element Cst.

The first electrode of the capacitive element Cst is electrically coupled between the second electrode of the first switching element S1 and the first electrode of the second switching element S2, and the second electrode thereof is electrically coupled between the second voltage lines VSS. The capacitive element Cst stores a voltage difference between the first and second electrodes. The capacitive element Cst transmits the stored voltage to the control electrode of the drive transistor MDR. The drive transistor MDR transmits the drive current to the OLED, and then the OLED emits light of a predetermined brightness by the transmitted drive current.

The anode of the OLED may be electrically coupled to the second electrode of the drive transistor MDR, and a cathode thereof may be electrically coupled to the VSS. The OLED emits light of the predetermined brightness by the drive current controlled through the drive transistor MDR.

Figure 7:
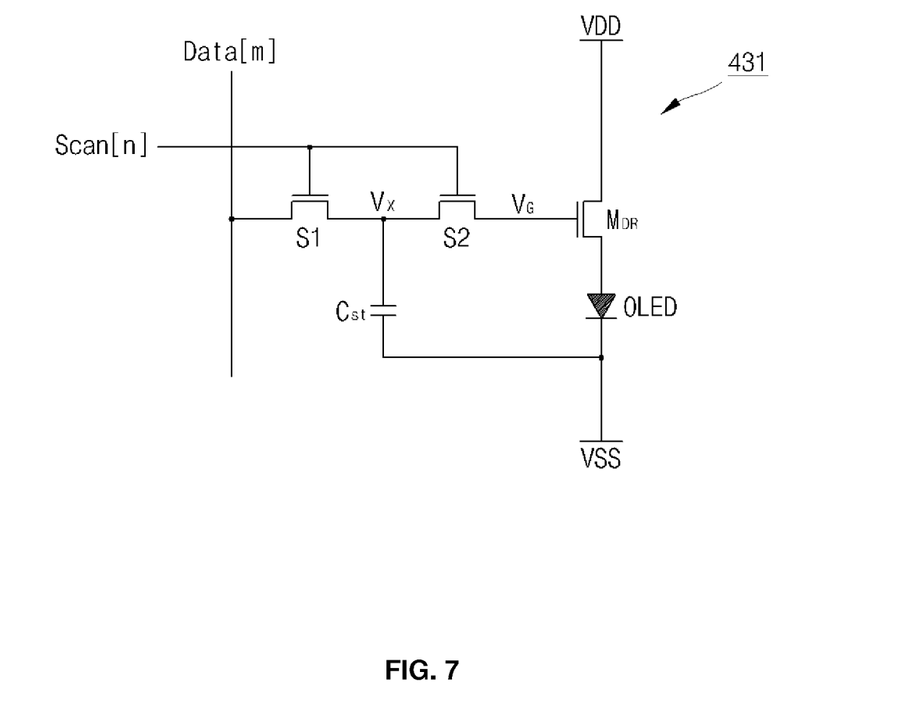
FIG. 7 is a circuit diagram illustrating a pixel circuit of a flat panel display according to yet another exemplary embodiment of the present invention.

FIG. 7 shows a circuit diagram illustrating a pixel circuit of a flat panel display according to a still another exemplary embodiment of the present invention. All pixel circuits to be explained below means one pixel circuit of the flat panel display 100 shown in FIG. 1. First and second switching elements S1 and S2 and a drive transistor MDR of the pixel circuit 431 of FIG. 7 are formed of NMOS transistors. When a high level scan signal is applied to a control electrode, the first and second switching elements S1 and S2 are turned on to apply a data voltage to the control electrode of the drive transistor. When the data voltage is applied to the control electrode, the drive transistor MDR transmits a drive current to an OLED. Then, the OLED is supplied with the drive current and emits lights of a predetermined brightness. The pixel circuit 431 of FIG. 7 operates the same as the pixel circuit 331 of FIG. 6 except that the first and second switching elements S1 and S2 operate at a high level.

Figure 8:
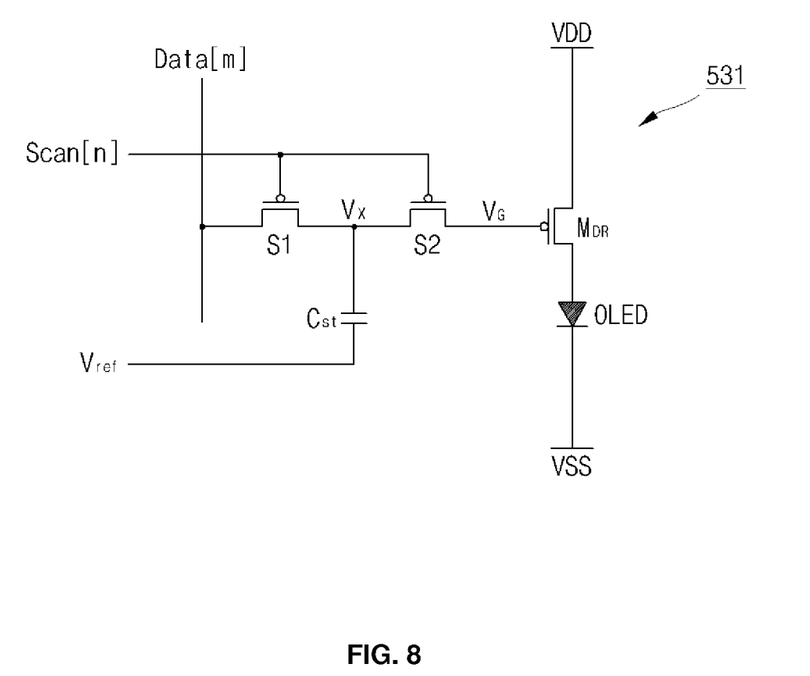
FIG. 8 is a circuit diagram illustrating a pixel circuit of a flat panel display according to yet another exemplary embodiment of the present invention.

FIG. 8 shows a circuit diagram illustrating a pixel circuit of a flat panel display according to a further still another exemplary embodiment of the present invention. All pixel circuits 531 to be explained below means one pixel circuit of the flat panel display 100 shown in FIG. 1. First and second switching elements S1 and S2 and a drive transistor MDR of the pixel circuit 531 of FIG. 8 are formed of PMOS transistors. When a low level scan signal is applied to a control electrode, the first and second switching elements S1 and S2 are turned on to apply a data voltage to the control electrode of the drive transistor MDR. When the data voltage is applied to the control electrode, the drive transistor MDR transmits a drive current to an OLED. Then, the OLED is supplied with the drive current and emits lights of a predetermined brightness.

The pixel circuit 531 of the flat panel display shown in FIG. 8 includes the first and second switching elements S1 and S2, a capacitive element Cst, the drive transistor MDR and the organic light emitting diode (OLED).

The first electrode of the first switching element S1 is electrically coupled to the data line Data[m], and the second electrode thereof is electrically coupled between the first electrode Vx of the second switching element S2 and the first electrode of the capacitive element Cst, and a control electrode (gate electrode) thereof is electrically coupled to a scan line Scan[n]. When a low level scan signal is applied to the control electrode of the first switching element S1, the first switching element S1 is turned on to supply the data voltage to the first electrode of the capacitive element Cst and the first electrode Vx of the second switching element S2. When a high level scan signal is applied to the control electrode of the first switching element S1, the first switching element S1 is turned off to interrupt the data voltage transmitted to the capacitive element Cst.

The first electrode Vx of the second switching element S2 is electrically coupled between the second electrode of the first switching element S1 and the first electrode of the capacitive element Cst, and the second electrode VG thereof is electrically coupled to the control electrode of the drive transistor MDR, and the control electrode thereof is electrically coupled to the scan line Scan[n]. When a low level scan signal is applied to the control electrode of the second switching element S2, the second switching element S2 is turned on to apply the data voltage applied from the first switching element S1 to the control electrode of the drive transistor MDR. When a high level scan signal is applied to the control electrode of the second switching element S2, the second switching element S2 is turned off to interrupt the voltage of the first electrode Vx transmitted to the second electrode VG.

In the case of a usual transistor, the lower a voltage between a drain electrode and a source electrode VDS is, the OFF resistance Roff is increased when the transistor is turned off. If the voltage level between the first and second electrodes Vx and VG of the second switching element S2 is reduced by using the characteristic as described above, the OFF resistance Roff of the second switching element S2 is increased. Thus, defects caused by the leakage current of the pixel circuit can be prevented. In other words, the OFF resistance Roff of the second switching element S2 is increased by minimizing the voltage between the first and second electrodes Vx and VG of the second switching element S2. Thus, the leakage current transmitted from the capacitive element Cst is prevented from being applied to the control electrode of the drive transistor MDR through the second switching element S2. The second switching element S2 prevents change of a drive current transmitted from the drive transistor MDR to the OLED. In other words, in the pixel circuit 331, the leakage current generated through the capacitive element Cst and first switching element S1 is similar to that of the conventional device. However, the pixel circuit 331 prevents the leakage current from being applied to the drive transistor MDR through the second switching element S2 whose OFF resistance Roff is high, thereby preventing the drive current applied to the OLED from being changed by the leakage current. The drive current of the pixel circuit 331 is not changed by the leakage current. Thus, image quality degradation of the display panel can be prevented.

A first electrode of the drive transistor MDR is electrically coupled to the first voltage line VDD, and a second electrode thereof is electrically coupled to an anode of the OLED, and a control electrode thereof may be electrically coupled to the second electrode of the second switching element S2. The drive transistor MDR is a P type channel transistor that supplies a predetermined amount of current from the first voltage line VDD to the OLED. Of course, the data voltage is supplied to the first electrode of the capacitive element Cst, thereby allowing the capacitive element to be charged. Thus, even if the first switching element S1 is turned off, the data voltage is continuously applied to the control electrode of the drive transistor MDR for a predetermined time by the charge voltage of the capacitive element Cst.

The first electrode of the capacitive element Cst is electrically coupled between the second electrode of the first switching element S1 and the first electrode of the second switching element S2, and the second electrode thereof is electrically coupled between third voltage lines Vref. The capacitive element Cst stores a voltage difference between the first and second electrodes. The capacitive element Cst transmits the stored voltage to the control electrode of the drive transistor MDR. The drive transistor MDR transmits the drive current to the OLED, and then the OLED emits light of a predetermined brightness by the transmitted drive current.

The anode of the OLED may be electrically coupled to the second electrode of the drive transistor MDR, and a cathode thereof may be electrically coupled to the VSS. The OLED emits light of the predetermined brightness by the drive current controlled through the drive transistor MDR.

Figure 9:
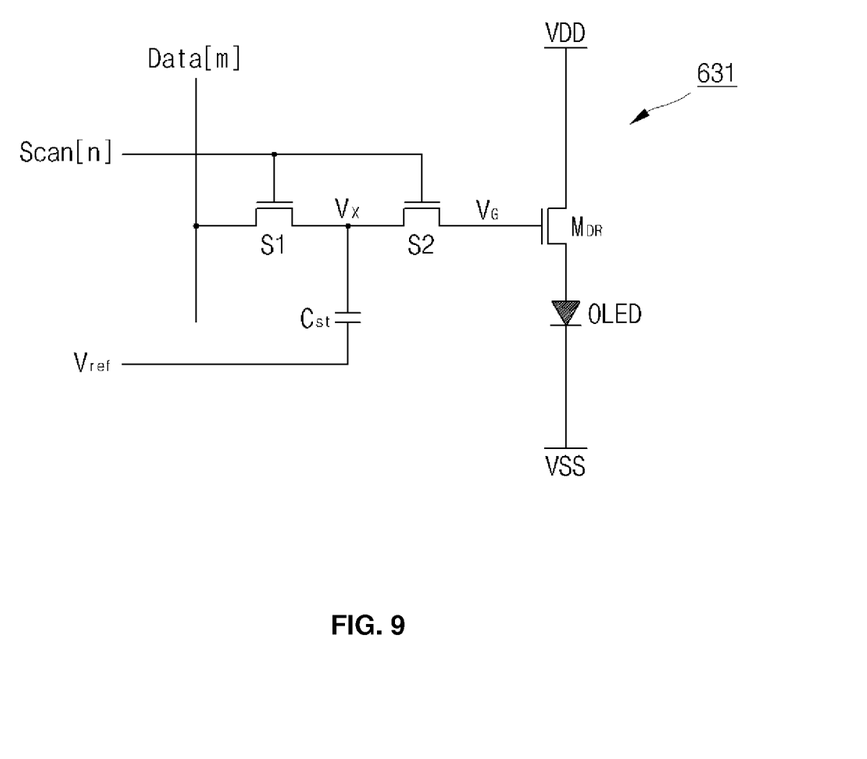
FIG. 9 is a circuit diagram illustrating a pixel circuit of a flat panel display according to yet another exemplary embodiment of the present invention.

FIG. 9 shows a circuit diagram illustrating a pixel circuit of a flat panel display according to a further still another exemplary embodiment of the present invention. All pixel circuits to be explained below means one pixel circuit of the flat panel display 100 shown in FIG. 1. First and second switching elements S1 and S2 and a drive transistor MDR of the pixel circuit 631 of FIG. 9 are formed of NMOS transistors. When a high level scan signal is applied to a control electrode, the first and second switching elements S1 and S2 are turned on to apply a data voltage to the control electrode of the drive transistor. When the data voltage is applied to the control electrode, the drive transistor MDR transmits a drive current to an OLED. Then, the OLED is supplied with the drive current and emits lights of a predetermined brightness. The pixel circuit 631 of FIG. 9 operates the same as the pixel circuit 531 of FIG. 8 except that the first and second switching elements S1 and S2 operate at a high level.

Figure 10:
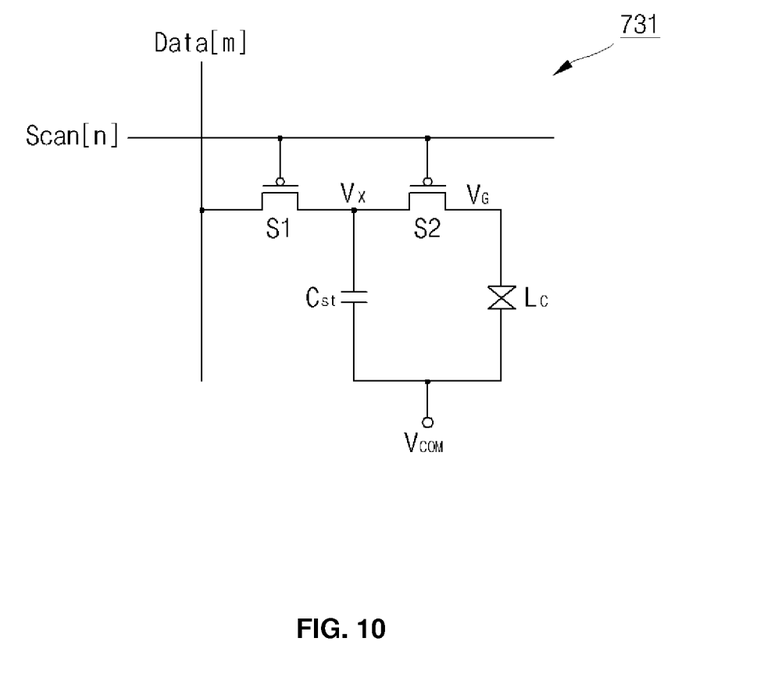
FIG. 10 is a circuit diagram illustrating a pixel circuit of a flat panel display according to yet another exemplary embodiment of the present invention.

FIG. 10 shows a circuit diagram illustrating a pixel circuit of a flat panel display according to a further still another exemplary embodiment of the present invention. All pixel circuits 731 to be explained below means one pixel circuit of the flat panel display 100 shown in FIG. 1. First and second switching elements S1 and S2 and a drive transistor MDR of the pixel circuit 731 of FIG. 10 are formed of PMOS transistors. When a low level scan signal is applied to a control electrode, the first and second switching elements S1 and S2 are turned on to transmit a data voltage to a pixel electrode Vp.

Referring to FIG. 10, the pixel circuit 731 includes the first and second switching elements S1 and S2, a liquid crystal LC and a capacitive element Cst.

The first electrode of the first switching element S1 is electrically coupled to the data line Data[m], and the second electrode thereof is electrically coupled between the first electrode Vx of the second switching element S2 and the first electrode of the capacitive element Cst, and a control electrode thereof is electrically coupled to a scan line Scan[n]. When a low level scan signal is applied to the control electrode of the first switching element S1, the first switching element S1 is turned on to supply the data voltage to the first electrode of the capacitive element Cst and the first electrode Vx of the second switching element S2. When a high level scan signal is applied to the control electrode of the first switching element S1, the first switching element S1 is turned off to interrupt the data voltage transmitted to the capacitive element Cst.

The first electrode Vx of the second switching element S2 is electrically coupled between the second electrode of the first switching element S1 and the first electrode of the capacitive element Cst, and the second electrode VG thereof is electrically coupled between the pixel electrode Vp and a first electrode of the liquid crystal LC, the control electrode of the drive transistor MDR, and the control electrode thereof is electrically coupled to the scan line Scan[n]. When a low level scan signal is applied to the control electrode of the second switching element S2, the second switching element S2 is turned on to apply the data voltage applied from the first switching element S1 to the pixel electrode Vp. When a high level scan signal is applied to the control electrode of the second switching element S2, the second switching element S2 is turned off to interrupt the voltage of the first electrode Vx transmitted to the pixel electrode Vp.

In the case of a usual transistor, the lower a voltage between a drain electrode and a source electrode VDS is, the OFF resistance Roff is increased when the transistor is turned off. If the voltage level between the first second electrode Vx of the second switching element S2 and the pixel electrode Vp is reduced by using the characteristic as described above, the OFF resistance Roff of the second switching element S2 is increased. Thus, defects caused by the leakage current of the pixel circuit can be prevented. In other words, the OFF resistance Roff of the second switching element S2 is increased by minimizing the voltage between the first electrode Vx of the second switching element S2 and the pixel electrode Vp. Thus, the leakage current transmitted from the capacitive element Cst is prevented from being applied to the liquid crystal LC through the second switching element S2. In other words, in the pixel circuit, the leakage current generated through the capacitive element Cst and first switching element S1 is similar to that of the conventional device. However, the pixel circuit prevents the leakage current from being applied to the liquid crystal LC by the second switching element S2 whose OFF resistance Roff is high, thereby preventing the leakage current from being applied to the liquid crystal LC. Thus, image quality degradation of the display panel can be prevented.

The first electrode of the liquid crystal LC is electrically coupled to the pixel electrode Vp, and a second electrode thereof is electrically coupled to a common electrode Vcom. When the data voltage is applied to the pixel electrode Vp and a common voltage is applied to the common electrode Vcom, arrangement of liquid crystal molecules of the liquid crystal LC is changed by electric field of a liquid crystal layer, thereby controlling amount of transmitted lights or interrupting the lights.

The first electrode of the capacitive element Cst is electrically coupled between the second electrode of the first switching element S1 and the first electrode of the second switching element S2, and the second electrode thereof is electrically coupled to the common electrode Vcom. In other words, the capacitive element Cst is connected in parallel to the liquid crystal LC. When the first switching element S1 is turned on to apply the data voltage to the pixel electrode Vp, the capacitive element Cst is charged with charge of amount corresponding to a voltage difference between the pixel electrode Vp and common electrode Vcom. When the high level scan signal is applied to the control electrode of the first switching element S1 to turn off the first switching element S1, the charge charged in the capacitive element Cst is supplied to the pixel electrode Vp during the turn-off period for keeping the liquid crystal driven. The amount of charge of the capacitive element Cst is determined by the voltage difference between the pixel electrode Vp and common electrode Vcom.

Figure 11:
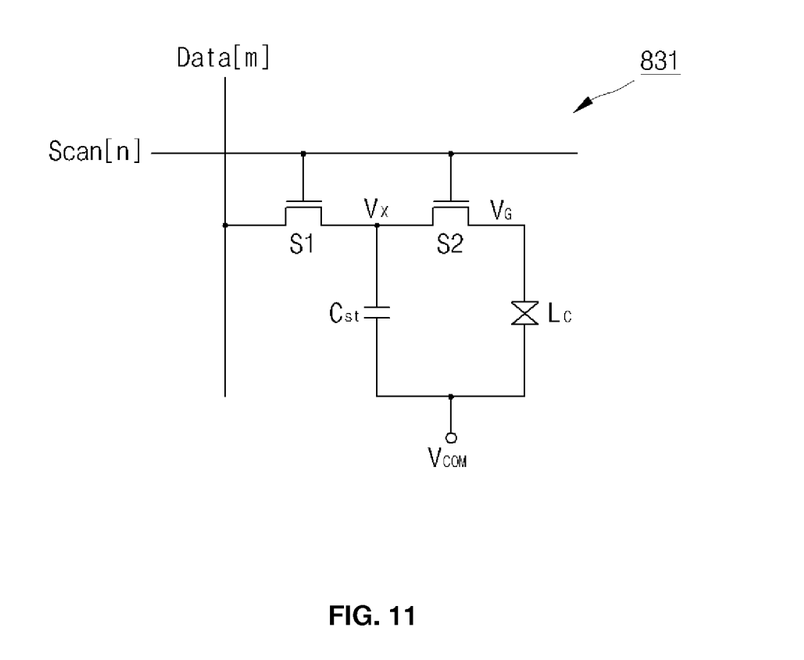
FIG. 11 is a circuit diagram illustrating a pixel circuit of a flat panel display according to yet another exemplary embodiment of the present invention.

FIG. 11 shows a circuit diagram illustrating a pixel circuit of a flat panel display according to a further still another exemplary embodiment of the present invention. All pixel circuits 831 to be explained below means one pixel circuit of the flat panel display 100 shown in FIG. 1. First and second switching elements S1 and S2 of the pixel circuit 831 of FIG. 11 are formed of NMOS transistors. When a high level scan signal is applied to a control electrode, the first and second switching elements S1 and S2 are turned on to transmit a data voltage to a first electrode of a capacitive element Cst and a pixel electrode Vp. When the data voltage is applied to the pixel electrode Vp and a common voltage is applied to the common electrode Vcom, arrangement of liquid crystal molecules of the liquid crystal LC is changed by electric field of a liquid crystal layer, thereby controlling amount of transmitted lights or interrupting the lights. The pixel circuit 831 of FIG. 11 operates the same as the pixel circuit 731 of FIG. 10 except that the first and second switching elements S1 and S2 operate at a high level.

As described above, the flat panel display according to the present invention produces the following effect.

The flat panel display prevents image quality degradation by preventing the current transmitted to the OLED or liquid crystal of the flat panel display from being changed by the leakage current and keeping the current stably.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A flat panel display, comprising:
a driving transistor serially connected to an organic light emitting diode between a high-potential voltage line (VDD) and a low-potential voltage line (VSS) to drive the light emitting element;
a first switching element for supplying a data voltage from a data line to a first node, the first switching element having a first electrode connected to the data line, a second electrode connected to the first node and a gate connected to a scan line;
a second switching element having one of source or drain that is connected directly to a gate electrode of the driving transistor, and a gate electrode of the second switching element connected to the scan line that is connected with the gate electrode of the first switching element, wherein the first switching element and the second switching element are configured to switch off by the same level of scan signal provided from the scan line; and
a capacitive element (CST) having one terminal directly connected to a separate reference voltage line (Vref) and another terminal coupled between the first and second switching elements, wherein the data voltage is continuously applied to the gate electrode of the driving transistor for a predetermined time by a voltage stored in the capacitive element and a parasitic capacitor of the driving transistor.

2. The flat panel display of claim 1, wherein the first switching element, the second switching element and the drive transistor are all formed of an N-type transistor such that the first switching element and the second switching element are simultaneously switched off by a low level scan signal from the same scan line and are simultaneously switched on by a high level scan signal from the same scan line, wherein the second switching element has a higher electrical resistance than that of the first switching element while the first and second switching elements are switched off.

3. The flat panel display of claim 1, wherein the first switching element, the second switching element and the drive transistor are all formed of a P-type transistor such that the first switching element and the second switching element are simultaneously switched off by a high level scan signal from the same scan line and are simultaneously switched on by a low level scan signal from the same scan line, wherein the second switching element has a higher electrical resistance than that of the first switching element while the first and second switching elements are switched off.

* * * * *